(12) United States Patent
Nakajima et al.

(10) Patent No.: US 9,333,575 B2
(45) Date of Patent: May 10, 2016

(54) WIRE ELECTRIC DISCHARGE MACHINE AND WIRE ELECTRODE REMOVAL DEVICE

(75) Inventors: Yoji Nakajima, Chiyoda-ku (JP); Syuichiro Ishihara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 740 days.

(21) Appl. No.: 13/697,995

(22) PCT Filed: Jan. 27, 2012

(86) PCT No.: PCT/JP2012/051818
§ 371 (c)(1),
(2), (4) Date: Nov. 14, 2012

(87) PCT Pub. No.: WO2013/111323
PCT Pub. Date: Aug. 1, 2013

(65) Prior Publication Data
US 2013/0193113 A1    Aug. 1, 2013

(51) Int. Cl.
*B23H 1/00*    (2006.01)
*B23H 7/10*    (2006.01)

(52) U.S. Cl.
CPC ... *B23H 1/00* (2013.01); *B23H 7/10* (2013.01)

(58) Field of Classification Search
CPC combination set(s) only.
See application file for complete search history.

(56) References Cited

U.S. PATENT DOCUMENTS 4,412,118 A *  10/1983  Nomura et al. ............ 219/69.12
5,006,692 A *   4/1991  Magara et al. ............. 219/69.12
5,268,551 A *  12/1993  Kawanabe et al. ........ 219/69.12
5,288,966 A *   2/1994  Kawanabe et al. ........ 219/69.12
2002/0125218 A1*  9/2002  Kita et al. ................. 219/69.12
2006/0049146 A1*  3/2006  Wehrli ....................... 219/69.12
2007/0278190 A1* 12/2007  Kita et al. ................. 219/69.12
2008/0223827 A1*  9/2008  Chang ....................... 219/69.12

FOREIGN PATENT DOCUMENTS

| JP | 63-28517 A   | 2/1988  |
| JP | 63-120034 A  | 5/1988  |
| JP | 63-123632 A  | 5/1988  |
| JP | 2-167622 A   | 6/1990  |
| JP | 2-237724 A   | 9/1990  |
| JP | 5-305527 A   | 11/1993 |
| JP | 2005-96049 A | 4/2005  |

OTHER PUBLICATIONS

International Search Report for PCT/JP2012/051818 dated May 1, 2012.

* cited by examiner

*Primary Examiner* — Dana Ross
*Assistant Examiner* — Renee L Miller
(74) *Attorney, Agent, or Firm* — Sughrue Mion, PLLC; Richard C. Turner (57) ABSTRACT

To provide a wire electrode removal device of a wire electric discharge machine, the wire electrode removal device including a wire-electrode guide unit that guides an end on a cut point side of a wire electrode cut by wire-electrode cut devices to outside of a running path, a rewind shaft that pressure-fixes the wire electrode on the cut point side guided by the wire-electrode guide unit with an end face thereof and rewinds the wire electrode on a columnar member having angular portions with subsequent rotational driving thereof, a rewind-shaft drive unit that drives the rewind shaft to perform pressure fixing or pressure releasing of the wire electrode with the rewind shaft, a scraper member that removes a wound wire electrode from the columnar member at a time of pressure releasing of the rewind shaft by the rewind-shaft drive unit, and a collection member that collects the removed wire electrode.

15 Claims, 7 Drawing Sheets

WIRE ELECTRIC DISCHARGE MACHINE AND WIRE ELECTRODE REMOVAL DEVICE

CROSS REFERENCE TO RELATED APPLICATIONS

This application is a National Stage of International Application No. PCT/JP2012/051818 filed Jan. 27, 2012, the contents of which are incorporated herein by reference in their entirety.

FIELD

The present invention relates to a wire electrode removal device that removes a wire electrode cut in a wire electric discharge machine.

BACKGROUND

A wire electric discharge machine generates an electric discharge by applying a pulse voltage between a wire electrode that is laid in a tensioned state between upper and lower wire-electrode guide units, and a workpiece and machines the workpiece into an arbitrary shape as by a jig saw while relatively moving the workpiece and the upper and lower wire-electrode guide units.

At the time of a wire electrode connection operation or wire electrode breakage handling during machining by the wire electric discharge machine, a wire electrode needs to be cut and removed, and removal of the wire electrode is performed by a technology described in any of Patent Literatures 1 to 5, for example.

CITATION LIST

Patent Literatures
Patent Literature 1: Japanese Patent Application Laid-open No. 2005-096049
Patent Literature 2: Japanese Patent Application Laid-open No. 63-120034
Patent Literature 3: Japanese Patent Application Laid-open No. 63-123632
Patent Literature 4: Japanese Patent Application Laid-open No. 2-237724
Patent Literature 5: Japanese Patent Application Laid-open No. 2-167622

SUMMARY

Technical Problem

In Patent Literature 1, a wire electrode cut by a wire-electrode cut device is sandwiched by a driving block and then the driving block is horizontally moved to recover the wire electrode in a predetermined wire-electrode collection box. However, wire electrodes that can be recovered are limited by a horizontal movement distance of the driving block and long wire electrodes cannot be removed.

If a long wire electrode remains between a upper wire-electrode guide and a lower wire-electrode guide, it is necessary to rotate a wire feeding roller in an opposite direction to that of feeding to rewind the wire electrode to obtain a wire electrode with the same length as the horizontal movement distance of the driving block or a smaller length, and then cut the wire electrode using the wire-electrode cut device to remove the wire electrode. Therefore, an automatic connection time becomes longer.

Furthermore, wire electrodes to be removed are substantially linear and a wire-electrode collection box according to lengths of the wire electrodes is required, which wastes a working space.

Patent Literature 2 discloses a wire electrode removal device that sucks and removes long wire electrodes. However, wire electrodes that can be used in a wire electric discharge machine generally have diameters $\phi$ from 0.1 to 0.3 and accordingly a large-scaled suction device that can suck thick wire electrodes ($\phi=0.3$, for example) is required even if a thin wire electrode ($\phi=0.1$, for example) is to be sucked, resulting in an excess performance. Furthermore, wire electrodes to be removed are substantially linear and a wire-electrode collection box according to lengths of the wire electrodes is required, which wastes a working space.

Patent Literatures 3 and 4 disclose a wire electrode removal device that removes a long wire electrode by feeding a wire electrode being sandwiched by belts or rollers. However, also in the case of Patent Literatures 3 and 4, wire electrodes to be removed are substantially linear and a wire-electrode collection box according to lengths of the wire electrodes is required, which wastes a working space.

Patent Literature 5 discloses a technology that enables to remove a long wire electrode by rewinding the wire electrode on a fork-like electrode-sandwiching unit at the time of wire electrode removal. Because the fork-like electrode-sandwiching unit sandwiches the wire electrode, however, when a notch of the fork-like electrode-sandwiching unit is smaller than a wire electrode diameter, the notch cannot be located at a wire-electrode running position not to interfere with the wire electrode during electric discharge machining and accordingly a movement distance of the fork-like electrode-sandwiching unit needs to be increased, which prevents downscaling of a cylinder. Meanwhile, when the fork-like electrode-sandwiching unit is made larger than a wire electrode diameter to downscale the cylinder, the wire electrode cannot be securely sandwiched and cannot be rewound.

When the wire electrode is to be rewound by the folk-like electrode-sandwiching unit, a rotation-position detection device needs to be mounted on a motor to prevent the wire electrode from being unwound due to its own spring property and falling from the folk-like electrode-sandwiching unit, or to install the notch of the folk-like electrode-sandwiching unit not to be in contact with the wire electrode during electric discharge machining, which complicates the mechanism.

Furthermore, the fork-like electrode-sandwiching unit pulls the wire electrode up in an outer-peripheral tangent direction of the fork-like electrode-sandwiching unit and thus the center of a wire guide is located at the notch of the fork-like electrode-sandwiching unit. Accordingly, the wire electrode can be rewound roughly perpendicularly to the wire guide but cannot be rewound exactly perpendicularly thereto, which may cause breakage of the wire electrode.

The present invention has been achieved to solve the above problems, and an object of the present invention is to provide a wire electric discharge machine and a wire electrode removal device that can remove long wire electrodes, reduce an automatic connection time, and minimize the possibility of breakage of wire electrodes.

Another object of the present invention is to downscale a wire-electrode collection box by compactly wrapping up removed wire electrodes to ensure a working space.

Solution to Problem

There is provided a wire electric discharge machine according to the present invention including: a wire-electrode cutting unit that is placed on a running path of a wire electrode to cut the wire electrode; and a removal unit that removes a wire electrode cut by the wire-electrode cutting unit from the running path, wherein the removal unit includes a wire-electrode guide unit that guides an end on a cut point side of the wire electrode cut by the wire-electrode cutting unit to outside of the running path, a rewind shaft that pressure-fixes the wire electrode on the cut point side guided by the wire-electrode guide unit with an end face thereof, and rewinds the wire electrode on a columnar member having angular portions with subsequent rotational driving, a rewind-shaft drive unit that drives the rewind shaft to perform pressure fixing or pressure releasing of the wire electrode with the rewind shaft, a scraper member that removes the wound wire electrode from the columnar member at a time of pressure releasing of the rewind shaft by the rewind-shaft drive unit, and a collection member that collects the removed wire electrode.

Advantageous Effects of Invention

The present invention has unprecedented significant effects such that long wire electrodes can be removed, an automatic connection time can be reduced, the possibility of breakage of wire electrodes is minimized, and that removed wire electrodes are compactly wrapped up to downscale a wire-electrode collecting box and to ensure a working space.

DESCRIPTION OF EMBODIMENTS

A wire electrode removal device and a wire electric discharge machine according to the present invention will be explained below in detail with reference to the accompanying drawings.

First Embodiment

Figure 1:
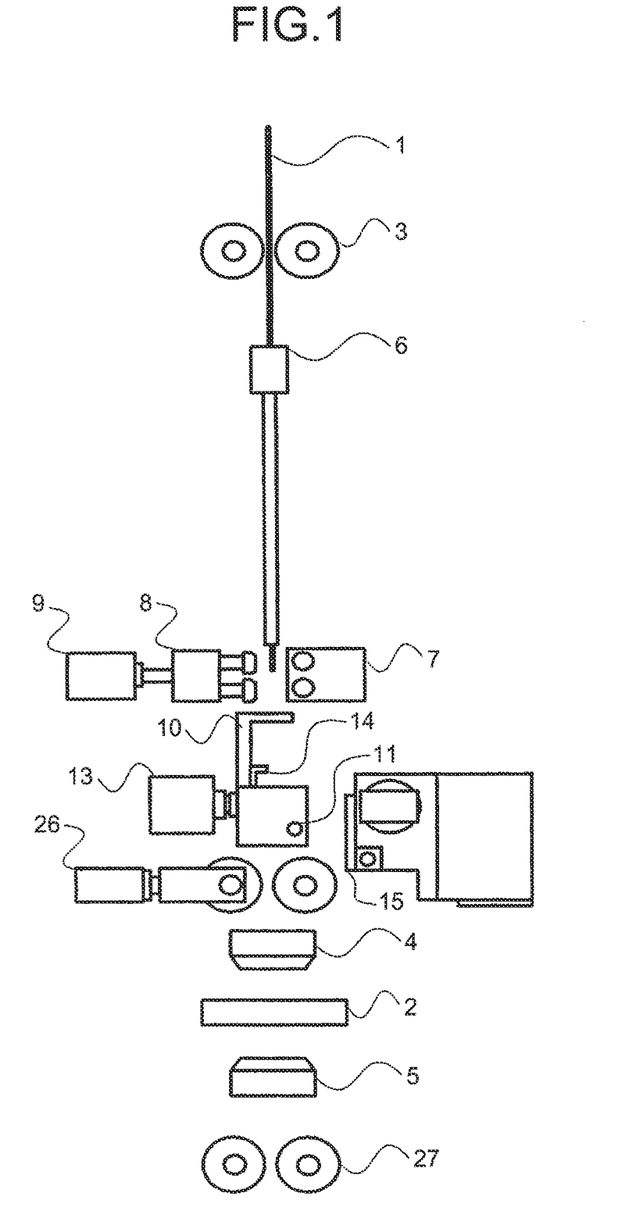
FIG. 1 is an explanatory diagram of a wire electrode automatic-connection device and a wire electrode removal device in a wire electric discharge machine.
Figure 2:
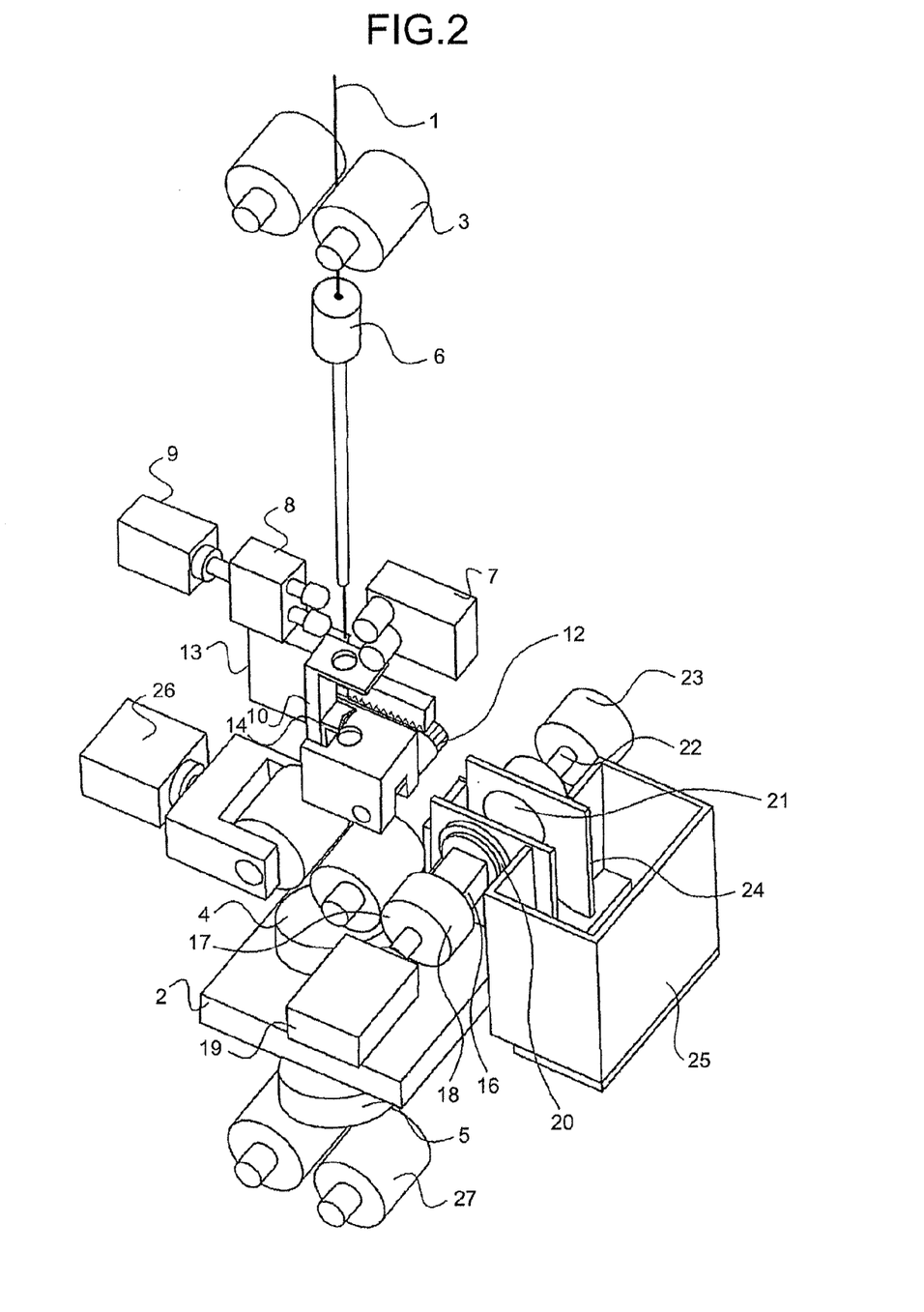
FIG. 2 is a perspective view of a configuration of the wire electrode removal device.

FIGS. 1 and 2 are explanatory diagrams of a wire electrode automatic-connection device and a wire electrode removal device in a wire electric discharge machine.

A wire electrode 1 is fed with rotation of a wire-electrode feed roller 3 to be laid in a tensioned state between an upper wire-electrode guide unit 4 and a lower wire-electrode guide unit 5 that determine a position of the wire electrode, an electric discharge is generated due to a pulse voltage applied between a workpiece 2 and the upper and lower wire-electrode guide units 4 and 5, and the workpiece is machined into an arbitrary shape as by a jig saw while the workpiece 2 and the upper and lower wire-electrode guide units 4 and 5 are relatively moved.

During machining, the wire electrode 1 is passed through a machining start hole of the workpiece 2 from the upper wire-electrode guide unit 4 and is automatically connected to a wire-electrode collection roller 27 that collects the wire electrode 1, by the wire electrode automatic-connection device including the wire-electrode feed roller 3 and a wire-electrode guide pipe 6.

The wire electrode 1 needs to be cut at the end of the machining, at the time of breakage of the wire electrode that is performing machining, when connection by the wire-electrode automatic-connection device fails because the wire electrode 1 is jammed on the upper wire-electrode guide unit 4, the lower wire-electrode guide unit 5, or the workpiece 2, or the like. Accordingly, there is provided a wire-electrode cut device that cuts the wire electrode 1 through electric heating while pressing the wire electrode 1 against a conducting cut member 7 using a cut-wire-electrode holder 8 in association with an operation of a cut cylinder 9.

The wire-electrode cutting method can be other methods instead of electric heating, such as cutting by a blade.

When the wire electrode 1 is broken during electric discharge machining, the wire electrode 1 remaining on a collection side from a breaking point, that is, on a side of the wire-electrode collection roller 27 is collected and removed by the wire-electrode collection roller 27 in a wire-electrode running direction during the wire electric discharge machining.

On the other hand, the wire electrode 1 remaining on a wire feed side from the breaking point, that is, between the wire-electrode cut device and the lower wire-electrode guide unit 5, or the like is cut by the wire-electrode cut device, and the wire electrode remaining between the wire-electrode cut device and the lower wire-electrode guide unit 5 needs to be removed. The cut wire electrode 1 can be removed by the wire-electrode cut device explained in the present embodiment, and then the remaining wire electrode can be passed again through the machining start hole of the workpiece by the wire-electrode automatic-connection device.

Also when connection by the wire-electrode automatic-connection device at an initial stage of the machining is not successfully performed, as well as when the wire electrode 1 is broken during electric discharge machining, the wire electrode is cut and the cut wire electrode 1 needs to be removed by the wire electrode removal device in the same manner as mentioned above.

In the wire electrode removal device, a rewind-wire-electrode guide 10 serving as a wire-electrode guide unit placed at a wire-electrode running position rotates around a rewind-wire-electrode guide shaft 11 to guide the wire electrode 1 cut by the wire-electrode cut device to a rewind shaft unit, the wire electrode 1 is sandwiched between a rewind shaft 16 having angular portions and a rewind roller 21 in the rewind shaft unit, the rewind roller 21 is rotated to cause the rewind shaft 16 to follow, and the wire electrode 1 is wound on the rewind shaft 16 to rewind the wire electrode 1 perpendicularly to the wire guide and remove the wire electrode 1.

When being rewound, the wire electrode 1 is held and applied with load by a rewind-wire-electrode holding upper-unit 14 and a rewind-wire-electrode holding lower-unit 15 to be pressed against the angular portions of the rewind shaft 16. The wire electrode 1 is plastically deformed to reduce the spring property of the wire electrode itself, so that a long wire electrode is removed with being compactly wrapped up.

A configuration of the wire electrode removal device according to the present embodiment is explained next in detail.

In the drawings, reference sign 10 denotes the rewind-wire-electrode guide located at a wire-electrode running position, which rotatingly moves around the rewind-wire-electrode guide shaft 11 through interaction with a pinion 12 mounted on the rewind-wire-electrode guide shaft 11 with a horizontal movement of a rewind-wire-electrode guide cylinder 13 with a rack.

The rewind-wire-electrode guide 10 has a through hole formed along a wire-electrode running path, through which the wire-electrode guide pipe 6 passes at the time of automatic connection, and the wire electrode 1 is run on the wire-electrode running path to perform electric discharge machining, during a wire-electrode non-removal time when the rewind-wire-electrode guide cylinder 13 with a rack does not horizontally move.

The rewind-wire-electrode guide 10 has a substantially L-shaped member having a notch formed therein, and has such a function that the notch of the L-shaped member is inclined to fall over the rewind shaft unit and guides the wire electrode 1 to the rewind shaft unit during a wire-electrode removal time when the rewind-wire-electrode guide cylinder 13 with a rack horizontally moves.

During wire electrode removal, the wire electrode 1 is positioned and held by the rewind-wire-electrode holding lower-unit 15 provided in the rewind shaft unit and the rewind-wire-electrode holding upper-unit 14 of the rewind-wire-electrode guide 10 formed at a position facing the rewind-wire-electrode holding lower-unit 15 to be applied with load at the time of sliding when the wire electrode 1 is to be rewound, which is explained later.

While the rewind-wire-electrode holding upper-unit 14 and the rewind-wire-electrode holding lower-unit 15 are suitably made of a high hardness material such as a ceramic material to slide the wire electrode 1, a rubber material or a resin material that can apply higher load to the wire electrode can be alternatively used. While the shape of these units is suitably a V-shaped groove for positioning, an inclined shape, a circular shape, or the like can be alternatively used.

In addition, while the rewind-wire-electrode holding upper-unit is attached to the rewind-wire-electrode guide and is arranged to operate together with the rewind-wire-electrode holding lower-unit with rotational driving, it is needless to mention that a cylinder for holding a rewind wire electrode different from the rewind-wire-electrode guide cylinder can be arranged to hold the wire electrode.

A configuration of the wire electrode removal device on the side of the rewind shaft unit is explained next with reference to FIG. 2.

Reference sign 16 denotes the rewind shaft, for example, in a box shape suitable for sandwiching the wire electrode, having angular portions for rewinding and removing the wire electrode 1. The rewind shaft 16 is effective in pressing the wire electrode 1 against thereto to plastically deform the wire electrode 1, and reducing the spring property of the wire electrode itself as long as the rewind shaft 16 has angular portions such as a triangular shape, a star shape, or a plate shape. Reference sign 17 denotes a rewind shaft housing that keeps the rewind shaft 16 therein, which is fixed to a rewind shaft bearing 18 that enables rotation of the rewind shaft 16 and can be horizontally moved by a rewind shaft cylinder 19 serving as a rewind-shaft drive unit, together with the rewind shaft bearing 18.

Reference sign 20 denotes a rewind shaft scraper through which the rewind shaft 16 passes and that scrapes the wire electrode 1 wound around the rewind shaft 16, from the rewind shaft 16.

Reference sign 21 denotes the rewind roller that is located at a position facing the rewind shaft 16 to sandwich the wire electrode 1 by working together with the rewind shaft 16 and to cause the rewind shaft 16 to follow. The rewind roller 21 is fixed to a rewind roller shaft 22 and rotated by driving of a rewind motor 23. The rewind motor 23 can be directly connected to the rewind shaft 16 to directly rotate the rewind shaft 16 by driving of the rewind motor 23.

Reference sign 24 denotes a removed-wire-electrode guide member that guides the scraped wire electrode 1 to a wire-electrode collection box 25. An air flow path can be provided to the removed-wire-electrode guide member 24 to blow the scraped wire electrode 1 to the wire-electrode collection box 25.

Reference sign 26 denotes wire-electrode holding rollers that are driven at the time of wire electrode cutting and hold the wire electrode 1 to facilitate the cutting. The wire-electrode holding rollers 26 serve as a guide when the wire electrode is pulled perpendicularly to the lower wire-electrode guide at the time of wire electrode removal.

An operation of cutting and removing a wire electrode performed in the wire electric discharge machine according to the present invention is explained next.

Figure 3:
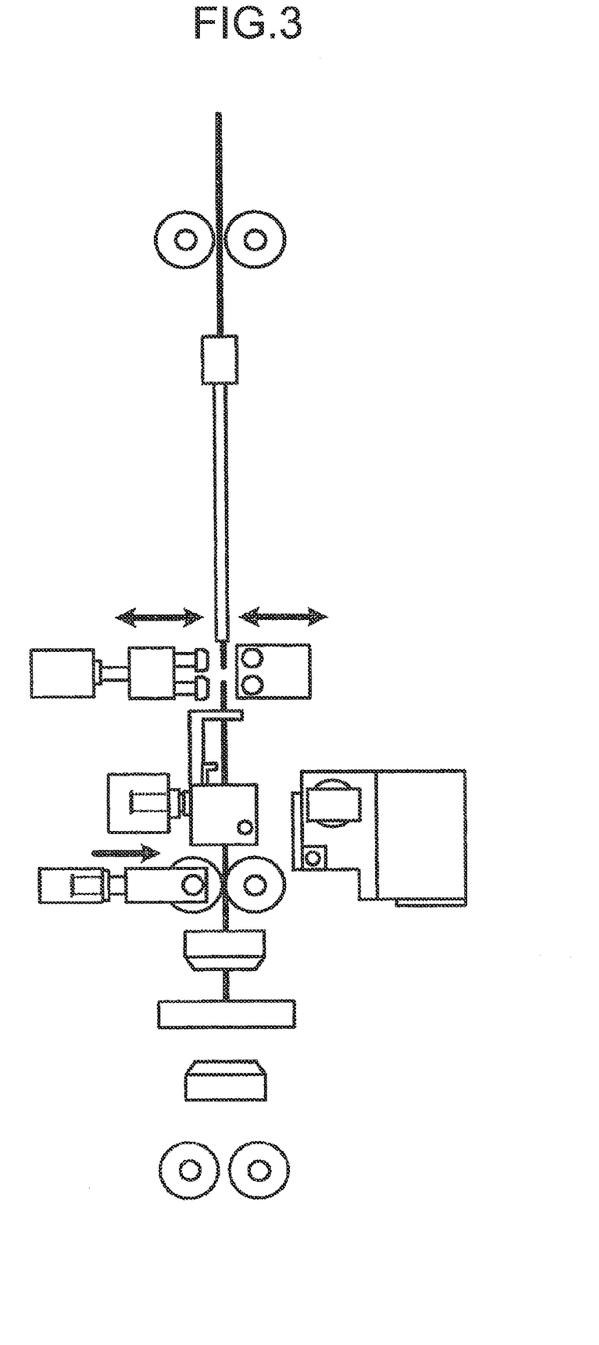
FIG. 3 is an operation explanatory diagram of an operation of the wire electrode removal device.

When wire electrode automatic connection fails or the wire electrode 1 is broken due to electric discharge machining, the wire electrode 1 is cut by the wire-electrode cut device including the conducting cut member 7, the cut-wire-electrode holder 8, and the cut cylinder 9 (see FIG. 3).

An end of the wire electrode 1 cut by the wire-electrode cut device is in a state where it passes through the through hole of the rewind-wire-electrode guide 10 and is supported thereby.

Figure 4:
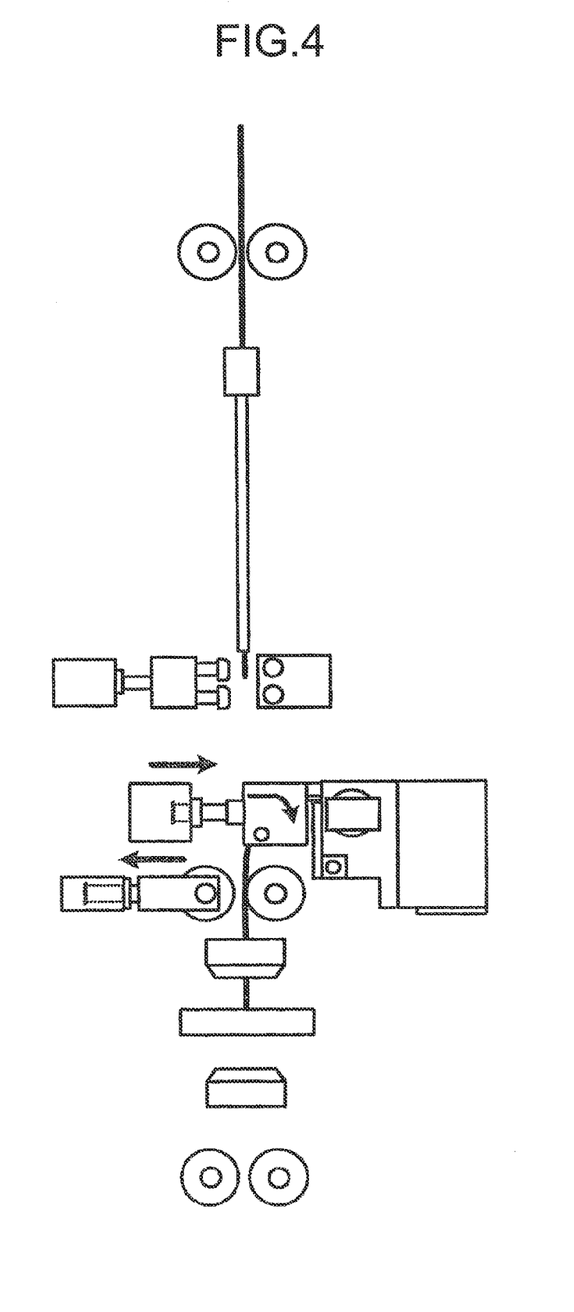
FIG. 4 is an operation explanatory diagram of an operation of the wire electrode removal device.

A horizontal movement of the rewind-wire-electrode guide cylinder 13 with a rack is then converted into a rotational movement by the pinion 12, which rotates the rewind-wire-electrode guide 10 by substantially 90 degrees on the rewind-wire-electrode guide shaft 11, so that the end of the cut wire electrode 1 is guided to the rewind shaft unit in a state where it is sandwiched by the wire-electrode holding rollers 26 (see FIG. 4).

Figure 5:
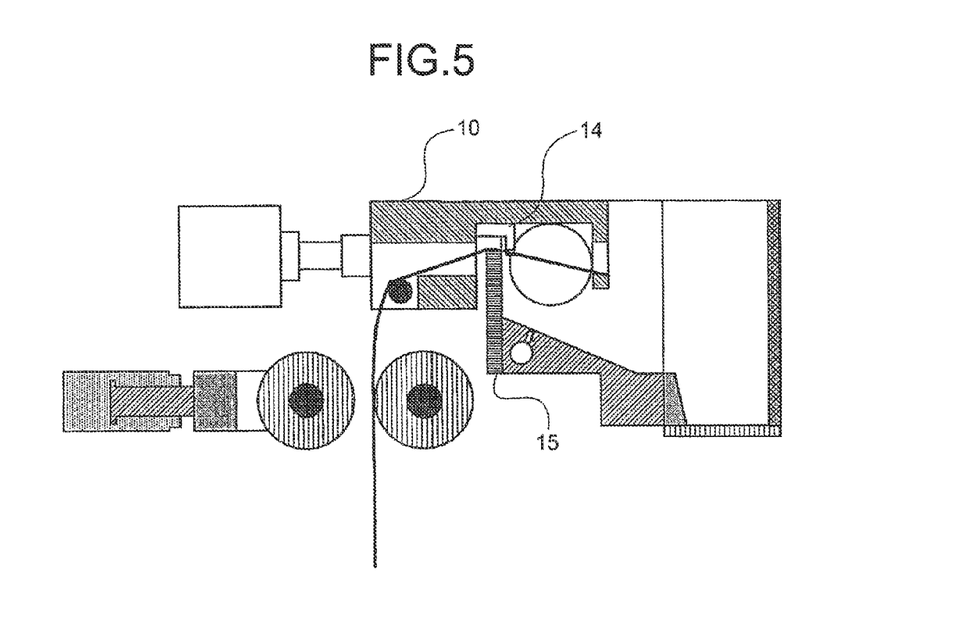
FIG. 5 is an operation explanatory diagram of an operation at the time of rewinding and removing a wire electrode.

A cross-sectional view of the rewind-wire-electrode guide 10 in a state of being guided to the rewind shaft unit is shown in FIG. 5.

As shown in FIG. 5, the wire electrode 1 on the side of the cut end is supported by the through hole of the rewind-wire-electrode guide 10 and by a sandwiching point between the rewind-wire-electrode holding upper-unit 14 and the rewind-wire-electrode holding lower-unit 15 shown in the right part of FIG. 5.

The rewind-wire-electrode holding upper-unit 14 and the rewind-wire-electrode holding lower-unit 15 ideally have a V-groove shape. The spring property of the wire electrode 1 itself can be reduced more and the wire electrode 1 can be wrapped up more compactly in a case where a position of winding on the rewind shaft 16 is limited, which is explained later.

Figure 6:
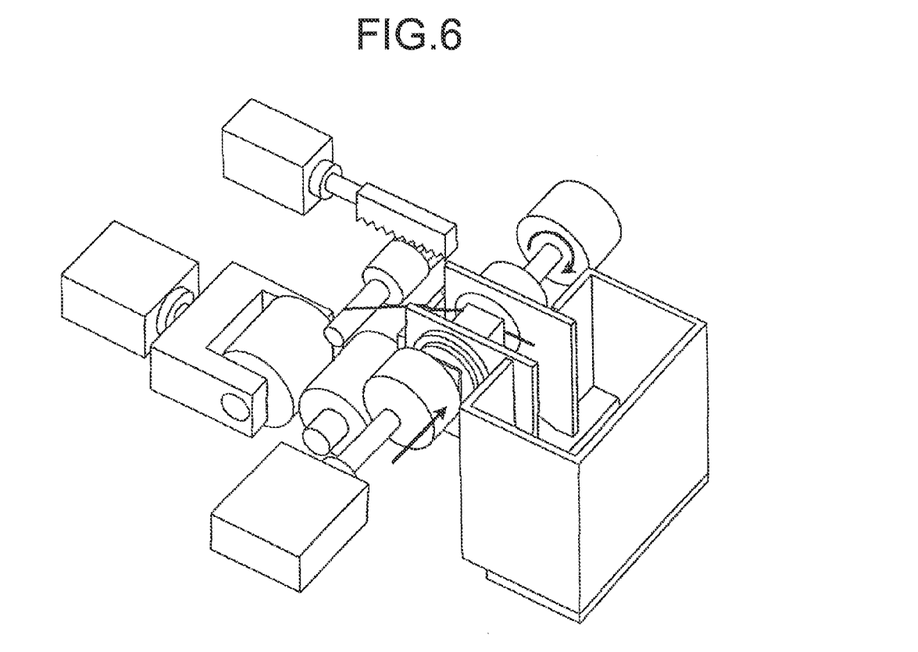
FIG. 6 is a perspective view for explaining an operation of the wire electrode removal device.

Thereafter, the wire electrode 1 guided to the rewind shaft unit is located at the notch of the rewind-wire-electrode guide 10, the rewind shaft 16 is horizontally driven by the rewind shaft cylinder 19, the rewind shaft 16 is inserted into the notch, and the wire electrode 1 is sandwiched between an end face of the rewind shaft 16 and the rewind roller 21 placed at a position facing the rewind shaft 16 (see FIG. 6).

Sandwiching of the wire-electrode holding rollers 26 is released and then the rewind motor 23 attached to the rewind roller shaft 22 is rotatingly driven with the wire electrode sandwiched, which causes the rewind roller 21 to rotate and the rewind shaft 16 to follow. As a result, the wire electrode 1 to be removed is rewound on the rewind shaft 16 and thus even a long wire electrode can be rewound.

Figure 7:
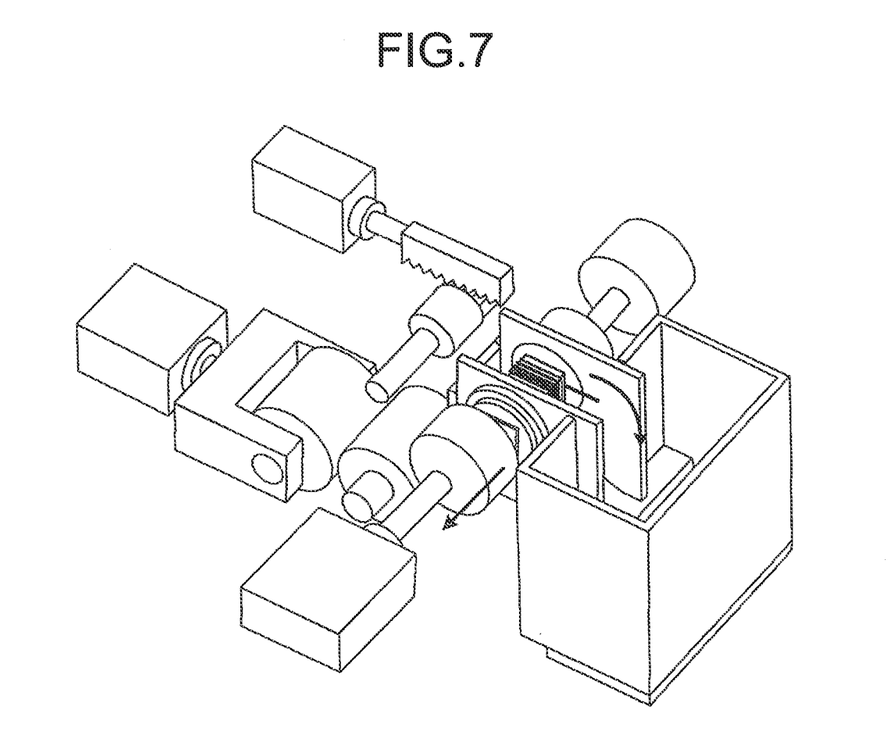
FIG. 7 is a perspective view for explaining an operation of the wire electrode removal device.

Because the wire electrode 1 is sandwiched between the rewind-wire-electrode holding upper-unit 14 and the rewind-wire-electrode holding lower-unit 15 at that time, the wire electrode 1 can be effectively rewound on the rewind shaft 16 with sufficient load applied by the rewind shaft 16 having the angular portions to the wire electrode 1 to be plastically deformed, and the rewound wire electrode 1 is compactly wrapped up because of plastic deformation (see FIG. 7).

When the rewind shaft 16 has a smaller diameter, the wire electrode 1 can be more compactly wrapped up during rewinding of the wire electrode 1 on the rewind shaft 16.

Figure 8:
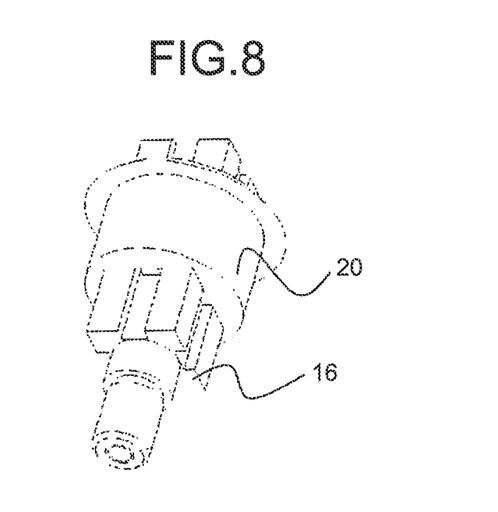
FIG. 8 is a configuration diagram of a configuration of a rewind shaft and a rewind shaft scraper.

When the rewind shaft 16 and the rewind shaft scraper 20 have a concave polygonal shape with concave and convex portions and the rewind shaft 16 is placed to fit the rewind shaft scraper 20 as shown in FIG. 8, the wire electrode 1 wound on the rewind shaft 16 can be more reliably scraped.

After the rewind-wire-electrode guide 10 is returned to the original position, the rewind shaft 16 is horizontally driven by the rewind shaft cylinder 19 and the wire electrode 1 wound on the rewind shaft 16 is scraped from the rewind shaft 16 by the rewind shaft scraper 20. The removed wire electrode 1 is guided by the removed-wire-electrode guide member 24 to the wire-electrode collection box 25.

To guide the removed wire electrode 1 to the wire-electrode collection box 25, an air flow path can be provided to the removed-wire-electrode guide member 24 to blow the scraped wire electrode 1 to the wire-electrode collection box 25.

According to the present embodiment, the scraped wire electrode is compactly wrapped up and the wire-electrode collection box 25 can be downscaled.

The position of the wire electrode 1 is remained by the wire-electrode holding rollers 26 without changing from the wire running position and the wire electrode can be rewound perpendicularly to the upper wire-guide unit, thereby preventing breaking of the wire electrode during rewinding.

While pressure fixing or releasing of the wire electrode by driving of the rewind shaft 16 in the horizontal direction has been explained, the direction of the driving is not limited to the horizontal direction and any direction such as a vertical direction can be applied to the present embodiment as long as a mechanism that can appropriately perform pressing, releasing, and rotation of the wire electrode is used.

Second Embodiment

In the first embodiment, when the cut wire electrode 1 is to be rewound on the rewind shaft 16, the wire electrode 1 is sandwiched between the rewind-wire-electrode holding upper-unit 14 and the rewind-wire-electrode holding lower-unit 15 and is rewound with load applied thereto. At that time, when an air pressure to the rewind-wire-electrode guide cylinder 13 with a rack is variable according to the diameter of the wire electrode 1 to enable adjustment of the load, thereby performing load adjustment by the rewind-wire-electrode holding upper-unit 14 and the rewind-wire-electrode holding lower-unit 15 according to the diameter of the wire electrode 1, breaking of the wire electrode during rewinding is also prevented and how the rewound wire electrode 1 is wrapped up can be adjusted.

The same effect is obtained when the wire electrode 1 is sandwiched by the wire-electrode holding rollers 26, load is applied to the wire electrode 1, and the load is adjusted during rewinding.

Third Embodiment

Figure 9:
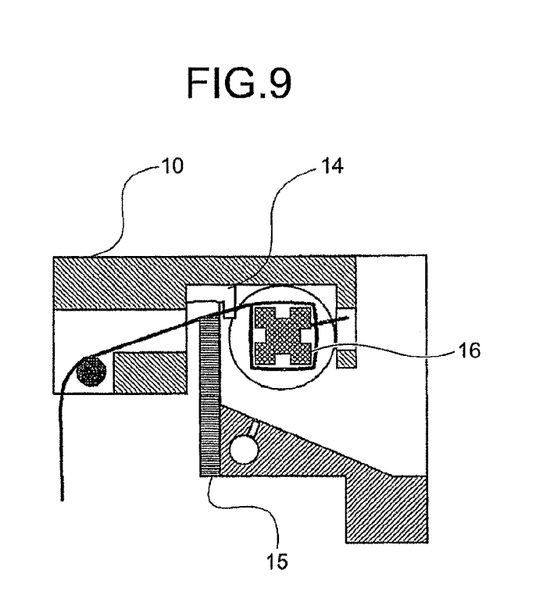
FIG. 9 depicts a configuration of a rewind-wire-electrode guide.

FIG. 9 is an enlarged view of relevant parts of the rewind-wire-electrode holding upper-unit 14 and the rewind shaft 16. In a third embodiment of the present invention, concave portions as shown in FIG. 8 are formed on the rewind shaft 16. When the cut wire electrode 1 is rewound while being sandwiched between the rewind-wire-electrode holding upper-unit 14 and the rewind shaft 16 during rewinding of the wire electrode 1 on the rewind shaft 16, the wire electrode 1 can be rewound being folded on the angular portions of the rewind shaft 16.

Similarly to the second embodiment, the air pressure to the rewind-wire-electrode guide cylinder 13 with a rack can be variable to adjust load and how the rewound wire electrode 1 is wrapped up can be adjusted by load adjustment according to the diameter of the wire electrode 1.

INDUSTRIAL APPLICABILITY

The present invention relates to a wire electric discharge machine including a wire electrode removal device, and in the present invention, long wire electrodes can be removed, an automatic connection time can be reduced, the possibility of breakage of wire electrodes is minimized, and removed wire electrodes are compactly wrapped up to downscale a wire-electrode collecting box to ensure a working space.

The invention claimed is:

1. A wire electric discharge machine comprising:
   a wire-electrode cutting unit that is placed on a running path of a wire electrode and configured to cut the wire electrode; and
   a removal unit configured to remove a wire electrode cut by the wire-electrode cutting unit from the running path, wherein
   the removal unit includes
   a wire-electrode guide unit configured to guide an end on a cut point side of the wire electrode cut by the wire-electrode cutting unit to outside of the running path,
   a rewind shaft comprising a member having angular sides and configured to press and fix the wire electrode on the cut point side guided by the wire-electrode guide unit with an end face of the rewind shaft, and rewind the wire electrode on the member with rotational driving,
   a rewind-shaft drive unit configured to drive the rewind shaft to perform pressing and fixing or releasing the pressing of the wire electrode by the rewind shaft,
   a scraper member through which the rewind shaft passes and configured to remove the wound wire electrode from the member when the rewind-shaft drive unit releases the pressing of the rewind shaft, and
   a collection member configured to collect the removed wire electrode.

2. The wire electric discharge machine according to claim 1, further comprising a rewind roller configured to face the end face of the rewind shaft, and the member of the rewind shaft is configured to rewind the wire electrode when the rewind roller is rotated while the wire electrode is sandwiched by the end face and the rewind roller.

3. The wire electric discharge machine according to claim 2, wherein
the rewind-shaft drive unit is configured to horizontally drive the rewind shaft to sandwich the wire electrode between the end face and the rewind roller, and
the wire electrode is scraped by the scraper member when the rewind-shaft drive unit horizontally drives the rewind shaft for releasing the pressing.

4. The wire electric discharge machine according to claim 1, further comprising a sandwiching unit configured to sandwich an opposite side of the wire electrode to a side pressure-fixed, thereby rewinding the wire electrode with load applied thereto during rewinding of the wire electrode by the rewind shaft.

5. The wire electric discharge machine according to claim 4, wherein the sandwiching unit is configured to sandwich the wire electrode between a rewind-wire-electrode holding upper-unit provided in the wire-electrode guide unit and a rewind-wire-electrode holding lower-unit provided on a side of the removal unit, to apply load to the wire electrode to be plastically deformed during wire electrode rewinding by the rewind shaft.

6. The wire electric discharge machine according to claim 1, further comprising a wire-electrode holding roller configured to hold the wire electrode when the end on the cut point side of the wire electrode is guided by the wire-electrode guide unit to outside of the running path, the wire-electrode holding roller being located below the wire-electrode guide unit.

7. The wire electric discharge machine according to claim 1, wherein the member of the rewind shaft has a cross section in a concave polygon shape.

8. The wire electric discharge machine according to claim 1, further comprising a removed-wire-electrode guide unit formed on the collection member that collects the removed wire electrode, thereby forming a path for guiding the removed wire electrode to the collection member.

9. The wire electric discharge machine according to claim 8, wherein a fluid member that sprays a fluid for guide to the removed-wire-electrode guide unit is provided to guide the removed wire electrode to the collection member.

10. The wire electric discharge machine according to claim 1, wherein the wire-electrode guide unit has a through hole through which a vertical wire electrode is configured to be inserted during electric discharge machining with the wire electrode, and is configured to rotate around a rewind-wire-electrode guide shaft during a removal operation of a wire electrode cut by the wire-electrode cutting unit, thereby guiding the end on the cut point side of the wire electrode to outside of the running path with the cut wire electrode placed in the through hole.

11. The wire electric discharge machine according to claim 10, further comprising a wire-electrode guide pipe inserted into the through hole formed in the wire-electrode guide unit.

12. The wire electric discharge machine according to claim 10, wherein the wire-electrode guide unit is configured to rotate around the rewind-wire-electrode guide shaft with a horizontal movement of a rewind-wire-electrode guide cylinder with a rack connected to the rewind-wire-electrode guide shaft.

13. The wire electric discharge machine according to claim 10, wherein the wire-electrode guide unit has a substantially L-shaped member with a notch formed thereon, and the wire electrode is configured to be pressure-fixed by the rewind shaft that is inserted into the notch of the substantially L-shaped member during a removal operation of the wire electrode.

14. A wire electrode removal device in a wire electric discharge machine, the wire-electrode removal device comprising:
a wire-electrode guide unit configured to guide an end on a cut point side of a wire electrode cut by a wire-electrode cut device to outside of a running path;
a rewind shaft comprising a member having angular sides and configured to press and fix the wire electrode on the cut point side guided by the wire-electrode guide unit with an end face of the rewind shaft, and rewind the wire electrode on the member with rotational driving;
a rewind-shaft drive unit configured to drive the rewind shaft to perform pressing and fixing or releasing the pressing of the wire electrode by the rewind shaft;
a scraper member through which the rewind shaft passes and configured to remove the wound wire electrode from the member when the rewind-shaft drive unit releases the pressing of the rewind shaft; and
a collection member configured to collect the removed wire electrode.

15. The wire electrode removal device according to claim 14, wherein the wire-electrode guide unit has a through hole through which a vertical wire electrode is configured to be inserted during electric discharge machining with the wire electrode, and is configured to rotate around a rewind-wire-electrode guide shaft during a removal operation of a wire electrode cut by the wire-electrode cut device, thereby guiding the end on the cut point side of the wire electrode to outside of the running path with the cut wire electrode placed in the through hole.

* * * * *